(12) United States Patent
Catania et al.

(10) Patent No.: US 10,289,630 B2
(45) Date of Patent: *May 14, 2019

(54) INTEGRATED DEVELOPER WORKFLOW FOR DATA VISUALIZATION DEVELOPMENT

(71) Applicant: Accenture Global Solutions Limited, Dublin (IE)

(72) Inventors: Jeffrey Catania, San Francisco, CA (US); Tiffany Dharma, Mountain View, CA (US); Aaron Pang, Oakland, CA (US); Teresa Sheausan Tung, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,421

(22) Filed: Jun. 27, 2017

(65) Prior Publication Data

US 2017/0293472 A1   Oct. 12, 2017

Related U.S. Application Data

(63) Continuation of application No. 15/016,504, filed on Feb. 5, 2016, now Pat. No. 9,727,623.

(51) Int. Cl.
*G06F 8/20* (2018.01)
*G06F 8/34* (2018.01)
(Continued)

(52) U.S. Cl.
CPC ............. *G06F 16/26* (2019.01); *G06F 8/20* (2013.01); *G06F 8/34* (2013.01); *G06F 8/36* (2013.01);
(Continued)

(58) Field of Classification Search
CPC ............. G06F 17/248; G06F 17/30572; G06F 17/30557; G06F 17/30867;
(Continued)

(56) References Cited

U.S. PATENT DOCUMENTS 6,405,364 B1 * 6/2002 Bowman-Amuah ........................ G06Q 10/06 717/124
6,684,369 B1 * 1/2004 Bernardo ............... G06F 17/211 715/205

(Continued)

OTHER PUBLICATIONS

Castello et al., "Visualizing Graphical and Textual Formalisms", 2001, IEEE (Year: 2001).*

(Continued)

*Primary Examiner* — Wei Y Zhen
*Assistant Examiner* — Junchun Wu
(74) *Attorney, Agent, or Firm* — Brinks Gilson & Lione

(57) ABSTRACT

A development platform system is disclosed that provides a development platform configured to create new and modified web-based applications. The development platform may be configured to search for and select a design layout template from available design layout templates stored on a database library. The development platform may further be configured to search for and select a data visualization template from available data visualization templates stored on a database library. The development platform may further be configured to generate a data visualization modification interface and accept a client device customization input to modify attributes of a data visualization. Templates that are modified by the development platform may be stored for subsequent look-up on a database library according to metadata describing attributes of the templates.

17 Claims, 13 Drawing Sheets

(51) Int. Cl.

| | | |
|---|---|---|
| *G06F 8/36* | (2018.01) | |
| *G06F 8/38* | (2018.01) | |
| *G06F 8/70* | (2018.01) | |
| *G06F 16/23* | (2019.01) | |
| *G06F 16/25* | (2019.01) | |
| *G06F 16/26* | (2019.01) | |
| *G06F 17/21* | (2006.01) | |
| *G06F 17/24* | (2006.01) | |
| *H04L 29/06* | (2006.01) | |
| *G06F 16/9535* | (2019.01) | |

(52) U.S. Cl.
CPC ................ *G06F 8/38* (2013.01); *G06F 8/70* (2013.01); *G06F 16/2379* (2019.01); *G06F 16/25* (2019.01); *G06F 16/9535* (2019.01); *G06F 17/211* (2013.01); *G06F 17/248* (2013.01); *H04L 63/08* (2013.01)

(58) Field of Classification Search
CPC ........ G06F 17/30377; G06F 8/20; G06F 8/34; G06F 8/70; H04L 63/08
USPC .......................................................... 717/120
See application file for complete search history.

(56) References Cited

U.S. PATENT DOCUMENTS

| | | | | |
|---|---|---|---|---|
| 6,985,905 | B2* | 1/2006 | Prompt ................ | G06F 16/252 707/829 |
| 7,185,271 | B2* | 2/2007 | Lee ........................ | G06F 16/95 715/226 |
| 7,263,663 | B2* | 8/2007 | Ballard ............... | G06F 16/9577 715/762 |
| 7,603,657 | B2* | 10/2009 | Gassner ..................... | G06F 9/06 717/113 |
| 8,520,002 | B2 | 8/2013 | Stambaug | |
| 8,576,218 | B2 | 11/2013 | Martinez | |
| 9,244,900 | B2* | 1/2016 | Kleinschmidt ........ | G06F 17/218 |
| 9,395,959 | B2* | 7/2016 | Hatfield ................ | G06Q 10/06 |
| 9,454,291 | B2* | 9/2016 | Helfman ................ | G06Q 10/10 |
| 9,568,909 | B2* | 2/2017 | Lawson ............. | G05B 19/4185 |
| 2005/0229254 | A1* | 10/2005 | Singh ...................... | G06F 21/55 726/23 |
| 2006/0173873 | A1* | 8/2006 | Prompt ................ | G06F 16/284 |
| 2007/0043694 | A1* | 2/2007 | Sawafta ................ | G06F 19/321 |
| 2008/0088877 | A1* | 4/2008 | Cacenco .................... | G06F 8/70 358/1.17 |
| 2009/0089312 | A1* | 4/2009 | Chi .................... | G06F 17/30867 |
| 2009/0100362 | A1* | 4/2009 | Sauve ........................ | G06F 8/34 715/765 |
| 2009/0322755 | A1 | 12/2009 | Holm-Petersen et al. | |
| 2010/0050097 | A1 | 2/2010 | McGreevey et al. | |
| 2010/0153839 | A1* | 6/2010 | Wilkins ................ | G06F 17/248 715/235 |
| 2010/0162146 | A1 | 6/2010 | Winkler et al. | |
| 2011/0088011 | A1* | 4/2011 | Ouali ........................ | G06F 8/10 717/105 |
| 2012/0144332 | A1 | 6/2012 | Sola | |
| 2013/0297588 | A1 | 11/2013 | Tyagi | |
| 2014/0040794 | A1* | 2/2014 | Jones ..................... | G06F 3/0484 715/763 |
| 2014/0304033 | A1 | 10/2014 | Cardno | |
| 2015/0040098 | A1* | 2/2015 | Akins ........................ | G06F 8/36 717/106 |
| 2015/0186132 | A1* | 7/2015 | Oliveri ..................... | G06F 8/34 717/120 |
| 2015/0186473 | A1 | 7/2015 | Chen et al. | |
| 2015/0212663 | A1 | 7/2015 | Papale et al. | |
| 2015/0223008 | A1 | 8/2015 | Watson | |
| 2016/0103928 | A1* | 4/2016 | Glasgow ............. | G06F 3/04847 715/234 |
| 2016/0314605 | A1* | 10/2016 | Filippi .................. | G06T 11/206 |

OTHER PUBLICATIONS

Gee et al., "Universal visualization platform", 2005, SPIE (Year: 2005).*

Heer et al., "Software Design Patterns for Information Visualization", Sep./Oct. 2006, IEEE, vol. 12, No. 5 (Year: 2006).*

Satyanarayan et al., "Lyra: An Interactive Visualization Design Environment", 2014, John Wiley & Sons Ltd., vol. 33, No. 3 (Year: 2014).*

Seifert et al., "Integrating Simulation Framework MEDIFRAME", 2003, IEEE (Year: 2003).*

Dogrusoz et al., "Graph Visualization Toolkits", Jan. 2002, IEEE (Year: 2002).*

Hendrix et al., "An Extensible Framework for Providing Dynamic Data Structure Visualizations in a Lightweight IDE", Mar. 2004, ACM (Year: 2004).*

Australia Patent Office, Examination Report No. 2 for Australia Patent Application No. 2017200055, dated Jan. 10, 2018, pp. 1-3.

Dogrusoz et al., "Graph Visualization Toolkits", Jan. 2002, IEEE.

Seifert et al., "Integrating Simulation Framework MEDIFRAME", Sep. 2003, IEEE.

Heer et al., "Software Design Patterns for Information Visualization", Sep. 2006, vol. 12, No. 5.

Satyanarayan et al., "Lyra: An Interactive Visualization Design Environment", 2014, John Wiley & Sons Ltd., vol. 33, No. 3.

Australian Examination Report No. 1 for Australian Patent Application No. 2017200055 dated Aug. 28, 2017, 6 pages.

* cited by examiner

INTEGRATED DEVELOPER WORKFLOW FOR DATA VISUALIZATION DEVELOPMENT

CROSS-REFERENCE TO RELATED APPLICATION(S)

This application is a continuation of U.S. patent application Ser. No. 15/016,504, filed on Feb. 5, 2016, the entirety of which is hereby incorporated by reference herein.

BACKGROUND

Web-based applications are stored and operate, at least in part, on a web server accessible by client communication devices (e.g., PCs, smartphones, and other devices) through a communications network. This client-server system configuration allows users operating their communication devices to access web-based applications from remote locations as long as their communication devices have access to a common communications network. In many cases, this attribute of allowing remote user access makes web-based applications preferable over applications that are stored and operated locally from a user's own computing device. Web-based applications may also be preferable for their ability to present information to a wider audience, and to present the information quickly and efficiently.

In an effort to efficiently create such web-based applications, application development programs may be utilized to develop web-based applications. Such application development programs may provide a set of pre-defined development tools for creating web-based applications. However, available application development programs typically restrict a developer from freely modifying applications outside of predetermined boundaries, or provide difficult to use and complicated to learn environments, both of which present significant obstacles to non-experts who wish to develop custom applications.

SUMMARY

A development platform system ("system") provides a development platform with development tools for creating web-based applications. The development platform comprises of a standardized structure of visualization components and layout templates for setting the components within a presentation layout and workflow. The standardized structure in which data is applied to the components and in which components are set into templates allows for the curation of a library of both visualization components and layout templates to be used by the development platform. The development platform greatly facilitates visualization capabilities available through network accessibility, and by packaging relevant technology in the system so that a developer does not need to install or configure such a system from scratch. In particular, the development platform includes development tools for enhancing the capabilities of data visualizations that may be included, modified, and deployed as part of a web-based application. The development platform further includes development tools for facilitating real-time updates to data visualizations. The development platform further includes development tools for saving new and/or modified data visualization templates to a database library for subsequent retrieval.

The system may comprise a database interface configured to communicate with a database library and a data source server, a communication interface configured to communicate with a client device, and a processor configured to communicate with the database interface and the communication database. The processor may further be configured to obtain, through the database interface, a layout template from the database library, the layout template including a data visualization panel. The processor may further be configured to obtain, through the database interface, a data visualization template from the database library, the data visualization template identifying the data source server and a data visualization structure. The processor may further be configured to receive, through the database interface, updateable data from the data source server. The processor may further be configured to render the updateable data into a data visualization according to the data visualization structure. The processor may further be configured to control display of the data visualization in the data visualization panel within the layout template. The processor may further be configured to generate a data visualization modification interface and accept a client device customization input of data visualization logic implemented by the data visualization. And, the processor may further be configured to modify the data visualization rendering logic responsive to the client device customization.

The system implements corresponding logic that facilitates receiving, through a communication interface, an access request from a client device, the access request including authentication information corresponding to a user, authenticating the access request based on the authentication information, obtaining, through a database interface, a layout template from a database library, the layout template including a data visualization panel, obtaining, through the database interface, a data visualization template from the database library, the data visualization template identifying a data source server and a data visualization structure, receiving, through the database interface, updateable data from the data source server, rendering the updateable data into a data visualization according to the data visualization form structure, controlling display of the data visualization in the data visualization panel within the layout template, generating a data visualization modification interface and accepting a client device customization input of data visualization logic implemented by the data visualization, and modifying the data visualization rendering logic responsive to the client device customization.

The system may comprise a database library configured to store a plurality of layout templates and a plurality of data visualization templates, a data source server configured to store updateable data for rendering into a data visualization, and a client device. The client device may comprise a communication interface, a memory configured to store instructions for operating a web application browser, and a processor configured to execute the instructions for operating the web application browser. The system may further comprise an application server. The application server may comprise a database interface configured to communicate with the database library and the data source server, a communication interface configured to communicate with the client device, and a processor configured to communicate with the database interface and the communication database. The processor may further be configured to obtain, through the database interface, a layout template from the database library, the layout template including a data visualization panel, obtain, through the database interface, a data visualization template from the database library, the data visualization template identifying the data source server and a data visualization structure, receive, through the database interface, updateable data from the data source server, render the updateable data into a data visualization according to the data visualization structure, control display of the data visualization in the data visualization panel within the layout template, generate a data visualization modification interface and accept a client device customization input of data visualization logic implemented by the data visualization, and modify the data visualization rendering logic responsive to the client device customization.

DETAILED DESCRIPTION

Figure 1:
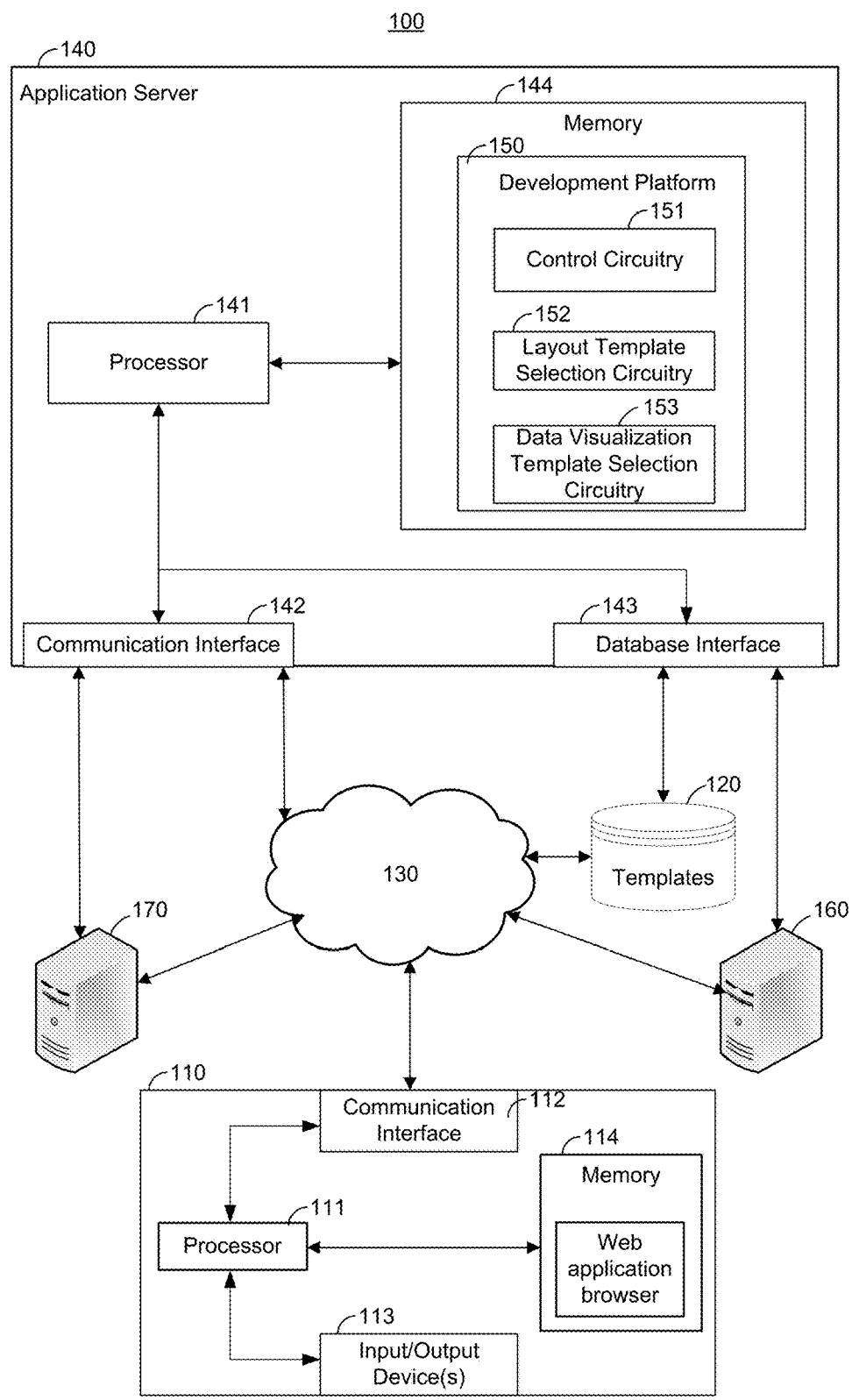
FIG. 1 illustrates an exemplary development platform system.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Given the increasing level of connectivity between users through the communication networks, there has been an increased interest and benefit to developing web-based applications. A web-based application is generally understood to be an application stored and configured to operate, at least in part, on a web server accessible to other communication devices connected to a common communication network. A user operating their communication device may communicate with the web-server through the common communication network to access and operate the web-based application. The web-based application offers many advantages, such as accessibility to remote users, based on its framework being stored on a web server(s).

Another advantage of web-based applications is the capability to present data in real-time, or substantially real-time as understood in the related field, to a vast number of remote users connected to a common communication network. The data may be presented on the web-based application in the form of data visualizations. A data visualization may be a visual representation of the data, which can take on a number of different structures. For example, a data visualization may be generated to represent data in a tabular structure (e.g., a bar graph, a table, a pie chart, or other known tabular structure), a geospatial structure (e.g., data is referenced to a geographical location or set of geographic coordinates which can be gathered, manipulated, and displayed in real-time), a hierarchical structure (e.g., a data model in which the data is represented by data nodes within a tree-like structure, where each data node is connected to another data node through a link and each data node records a collection of fields having a value), or a time-series structure (e.g., a time series data structure may be a sequence of data points, typically consisting of successive measurements made over a time interval).

The development platform system ("system") described below provides a development platform configured to include tools for creating a web-based application with one or more visualization plug-ins, each of which may be customized. For example, the development platform may be configured to allow the developer to search for and select a design layout template from multiple available design layout templates that are presented as a result of the search query. Each design layout template may be comprised of one or more components. Exemplary components include a data visualization template, a navigation tools component, a details information component, and a panel component.

The development platform may further be configured to search for and select a data visualization template from available data visualization templates that are presented as a result of the search query. As described, the data visualization template may be a component within a selected design layout template. The data visualization template may include instructions for rendering a data visualization in a specified data visualization structure based on data received from an identified database source. In order to present data in real-time, or substantially real-time, data for the data visualization may be sourced from a real-time database source configured to transmit the data to the web server hosting the web-based application so that the web-based application may render the data visualization of the data as the web-based application receives the data from the real-time database source.

In some implementations, the development platform may allow the developer to independently modify attributes of a data visualization included on the web-based application. Therefore, the development platform may further be configured to provide the developer with a data visualization modification interface that allows the developer to modify attributes of the data visualization.

The development platform may further be configured to generate metadata describing attributes of the data visualization, and associate the metadata to the corresponding data visualization template or other corresponding component. The development platform may further be configured to store a new or modified data visualization template, with or without corresponding metadata, on a database library. The developer may later access the database library while developing a subsequent web-based application, and search for a particular data visualization template based on information described by the corresponding metadata. Exemplary metadata attached to a data visualization template may describe an author who created the data visualization template, a name identifying the data visualization template, an industry for which the data visualization template was created, a database source for the data visualization template, a data visualization structure and/or format of a data visualization that will be rendered within the data visualization template based on data obtained from a data source, attributes describing the web-based application(s) in which the data visualization template was used, and/or data relationships (e.g., comparisons or outlier identification) for the data that comprises the data visualization rendered within the data visualization template.

These and other features of the development platform system are described in this disclosure.

FIG. 1 illustrates exemplary system architecture for development platform system 100 that includes component devices for implementing the described features. Development platform system 100 includes an application server 140 configured to include the hardware, software, and/or middleware for operating the described development platform 150. Application server 140 is shown to include a processor 141, a memory 144, a communication interface 142, and a database interface 143.

Development platform system 100 further includes a database library 120 configured to store application layout templates and/or data visualization templates. The database library 120 is configured to provide templates to the development platform 150 either directly, or through a network 130, via the database interface 143. Development platform system 100 further includes a data server 160 configured to store, receive, and transmit data. The data server 160 is configured to provide data for rendering into data visualizations according to the development platform 150 either directly, or through network 130, via the database interface 143. Development platform system 100 further includes a secondary application server 170 configured to communicate with the application server 140 either directly, or through network 130. Secondary application server 170 may be configured to store and/or operate a web-based application developed by the development platform 150, according to some embodiments. According to other embodiments, a web-based application developed by the development platform 150 may be stored and/or operated on the application server 140.

The development platform system 100 communicates with any number and type of communication devices 110, where communication device 110 may include well known computing systems, environments, and/or configurations that may be suitable for implementing features of the development platform 150 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like. FIG. 1 shows that the communication device 110 includes a processor 111, a memory 114 configured to store the instructions for operating a web application browser, an input/output devices 113, and a communication interface 112. A user operating the communication device 110 may run the web application browser to access the development platform 150 running on the application server 140.

Development platform 150 may be a representation of software, hardware, and/or middleware configured to implement features of the development platform 150, such as for the development and/or modification of a web-based application. For example, the development platform 150 may be a web-based application operating, for example, according to a .NET framework within the development platform system 100.

More specifically, the development platform 150 may include control circuitry 151, layout template selection circuitry 152, and data visualization template selection circuitry 153. Each of the control circuitry 151, the layout template selection circuitry 152, and the data visualization template selection circuitry 153 may be a representation of software, hardware, and/or middleware configured to implement respective features of the development platform 150.

Control circuitry 151 may be configured to include configuration controls enabling a user (e.g., authorized user) to configure certain features of development platform 150. Control circuitry 151 may further be configured to include security controls for authenticating users to access, use, and/or configure features of the development platform 150. Control circuitry 151 may further be configured to include log-in controls that control a log-in process enabling the communication device 110 to log-in and access the development platform 150 running on application server 140.

To access the development platform 150, a user may open a web application browser on the communication device 110. The web application browser may then request access to the development platform 150 by transmitting an access request signal to the application server 140 through the network 130, via the communication interface 112. The access request signal may be received by the application server 140 via the communication interface 142, and further received by the control circuitry 151 of the development platform 150. Control circuitry 151 may then control a log-in protocol by receiving and authenticating log-in credentials included in the access request signal (e.g., user name, password, authentication of the communication device 110, etc.). According to some embodiments, the control circuitry 151 may also control a security protocol by determining the user's access level based on the log-in credentials included in the access request signal. According to some embodiments, the control circuitry 151 may grant authenticated user's identified as having certain predetermined access levels the capability to configure features and/or attributes of the development platform 150. After successfully passing the log-in protocol and/or security protocol, a user may be allowed to operate the development platform 150 from the web application browser running on the user's communication devise 110.

Figure 8:
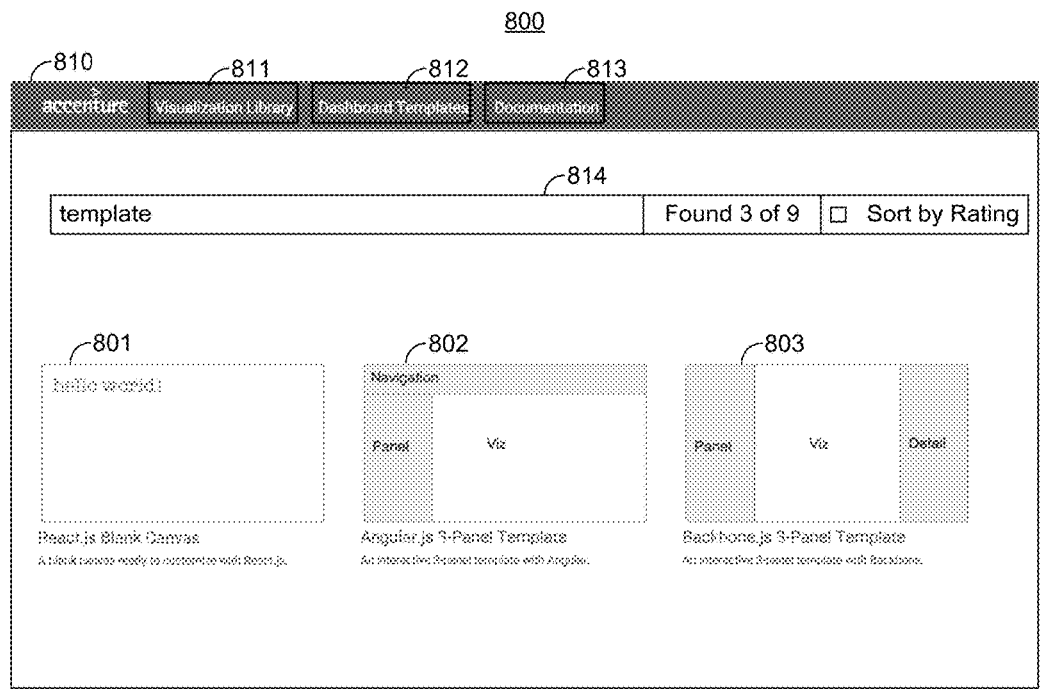
FIG. 8 illustrates another exemplary graphical interface of the development platform system for searching data visualization templates.

During operation of the development platform 150, the user may control the layout template selection circuitry 152 to select an application layout template that will serve as the foundational layout for a new web-based application. For example, FIG. 8 illustrates an exemplary development platform user interface 800 of the development platform 150 that allows the user to input a search query and select an application layout template from a search query result that includes a blank canvas layout 801, an angular 3-panal template 802 (e.g., includes a navigation section along a top of the web-application interface, a panel for providing information on a first side of the web-application interface, and a data visualization on a second side of the web-application interface), and a backbone 3-panel template 803 (e.g., includes a panel for providing information in a first section of the web-application interface, a data visualization in a second section of the web-application interface, and a detailed information section in a third section of the web-application interface). The search query may be entered into a search query input field 814. Development platform user interface 800 further includes a navigation pane 810 comprised of a visualization library menu 811, a dashboard templates menu 812 (FIG. 8 illustrates the development platform user interface 800 according to the dashboard templates menu), and a documentation menu 813.

Development platform 150 may communicate with the database library 120, either directly or through network 130, to retrieve the selected application template. According to some embodiments, the control circuitry 151 may identify the user's access level based on information included in the access request signal, and grant the user access to certain authorized templates (e.g., web-application templates or data visualization templates) from the database library 120, while preventing access to other templates stored on the database library 120.

During operation of the development platform 150, the user may control the data visualization template selection circuitry 153 to select a data visualization template to include in the web-based application being developed by the development platform 150. The data visualization template includes information identifying a database source from which data will be obtained to render a data visualization. The database source may transmit data according to a predetermined schedule, or substantially in real-time. The data visualization may further include information identifying the data visualization structure in which the data from the database source will be rendered. For example, a data visualization may be generated to represent data in a tabular structure (e.g., a bar graph, a table, a pie chart, or other known tabular structure), a geospatial structure (e.g., data is referenced to a geographical location or set of geographic coordinates which can be gathered, manipulated, and displayed in real-time), a hierarchical structure (e.g., a data model in which the data is represented by data nodes within a tree-like structure, where each data node is connected to another data node through a link and each data node records a collection of fields having a value), or a time-series structure (e.g., a time series data structure may be a sequence of data points, typically consisting of successive measurements made over a time interval).

Figure 7:
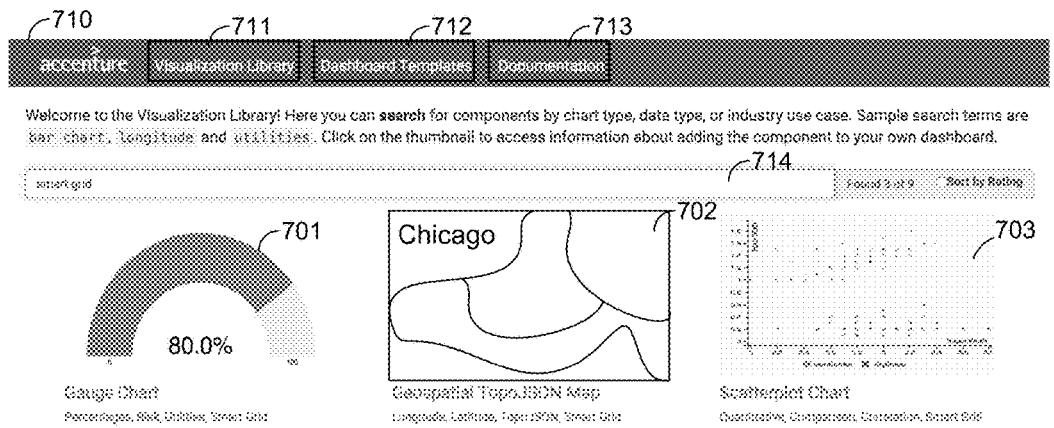
FIG. 7 illustrates an exemplary graphical interface of the development platform system for searching data visualization templates.

FIG. 7 illustrates an exemplary development platform user interface 700 of the development platform 150 that allows the user to input a search query and select a data visualization template from a search query result that includes a gauge chart 701, a geospatial map 702, and a scatterplot chart 703. The search query may be entered into a search query input field 714. Development platform user interface 700 further includes a navigation pane 710 comprised of a visualization library menu 711 (FIG. 7 illustrates the development platform user interface 800 according to the visualization library menu), a dashboard templates menu 712, and a documentation menu 713.

Development platform 150 may communicate with database library 120, either directly or through network 130, to retrieve the selected data visualization template. According to some embodiments, control circuitry 151 may identify the user's access level based on information included in the access request signal, and grants the user access to certain authorized templates (e.g., web-application templates or data visualization templates) from database library 120, while preventing access to other templates stored on the database library 120.

Data visualization template selection circuitry 153 may control communication with data server 160 to request data for rendering a data visualization, according to the selected data visualization template. Data server 160 may then transmit data to application server 140, which is received via database interface 143. The data may then be received and processed by data visualization template selection circuitry 153. Data visualization template selection circuitry 153 may then render the selected data visualization based on the received data. According to some embodiments, data server 160 may transmit data to the data visualization template selection circuitry 153 in real-time, thus enabling the data visualization template selection circuitry 153 to render the selected data visualization to reflect the real-time updates to the data.

According to some embodiments, the user may control data visualization template selection circuitry 153 to select a database (e.g., database library 120) for storing new or modified data visualization templates created by the user. Each data visualization template stored into the database library 120 may also include metadata for describing attributes of the data visualization template. Exemplary metadata attached to the data visualization template may describe an author who created the data visualization template, a name identifying the data visualization template, an industry for which the data visualization template was created, a database source for the data visualization template, a data visualization structure of the data visualization template, or attributes describing the web-based application(s) in which the data visualization template was used.

Figure 2:
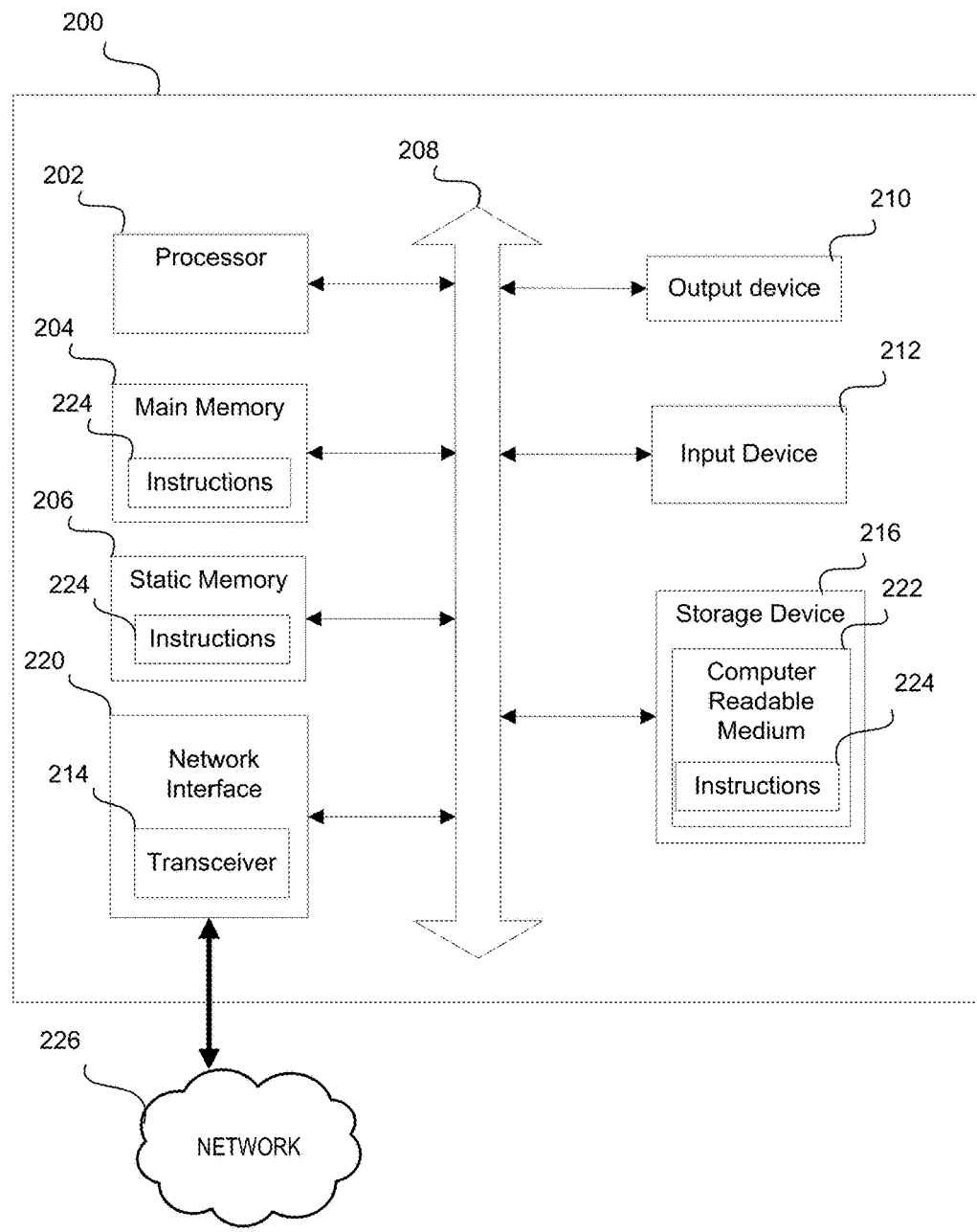
FIG. 2 illustrates a block diagram of an exemplary computer architecture for a device in the exemplary development platform system illustrated in FIG. 1.

Each of communication device 110, database library 120, application server 140, data server 160, and secondary application server 170 may include one or more components of computer system 200 illustrated in FIG. 2.

FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an embodiment, network 226 may support wireless communications. In another embodiment, network 226 may support hard-wired communications, such as a telephone line or cable. In another embodiment, network 226 may support the Ethernet IEEE (Institute of Electrical and Electronics Engineers) 802.3x specification. In another embodiment, network 226 may be the Internet and may support IP (Internet Protocol). In another embodiment, network 226 may be a LAN or a WAN. In another embodiment, network 226 may be a hotspot service provider network. In another embodiment, network 226 may be an intranet. In another embodiment, network 226 may be a GPRS (General Packet Radio Service) network. In another embodiment, network 226 may be any appropriate cellular data network or cell-based radio network technology. In another embodiment, network 226 may be an IEEE 802.11 wireless network. In still another embodiment, network 226 may be any suitable network or combination of networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 215. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the development platform 150. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the development platform 150.

Although computer system 200 is represented in FIG. 2 as a single processor 202 and a single bus 208, the disclosed embodiments applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of communication device 110, storage device 216 may be distributed across to application server 140 when communication device 110 is in communication with application server 140 during operation of the development platform 150.

Storage device 216 may include a controller (not shown) and a computer readable medium 222 having instructions 224 capable of being executed by processor 202 to carry out functions of the development platform 150. In another embodiment, some or all of the functions are carried out via hardware in lieu of a processor-based system. In one embodiment, the controller included in storage device 216 is a web application browser, but in other embodiments the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly in some embodiments, output device 210 displays a user interface. In other embodiments, output device 210 may be a speaker configured to output audible information to the user. In still other embodiments, any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources. For example, according to some embodiments the communications interface 142 (i.e., a communications network interface) and database interface 143 (i.e., a database network interface) may be separate network interface card hardware components dedicated to communicating with different data sources. In other embodiments, communications interface 142 and database interface 143 may be representative of a single network interface card hardware component configured to communicate with different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

Figure 3:
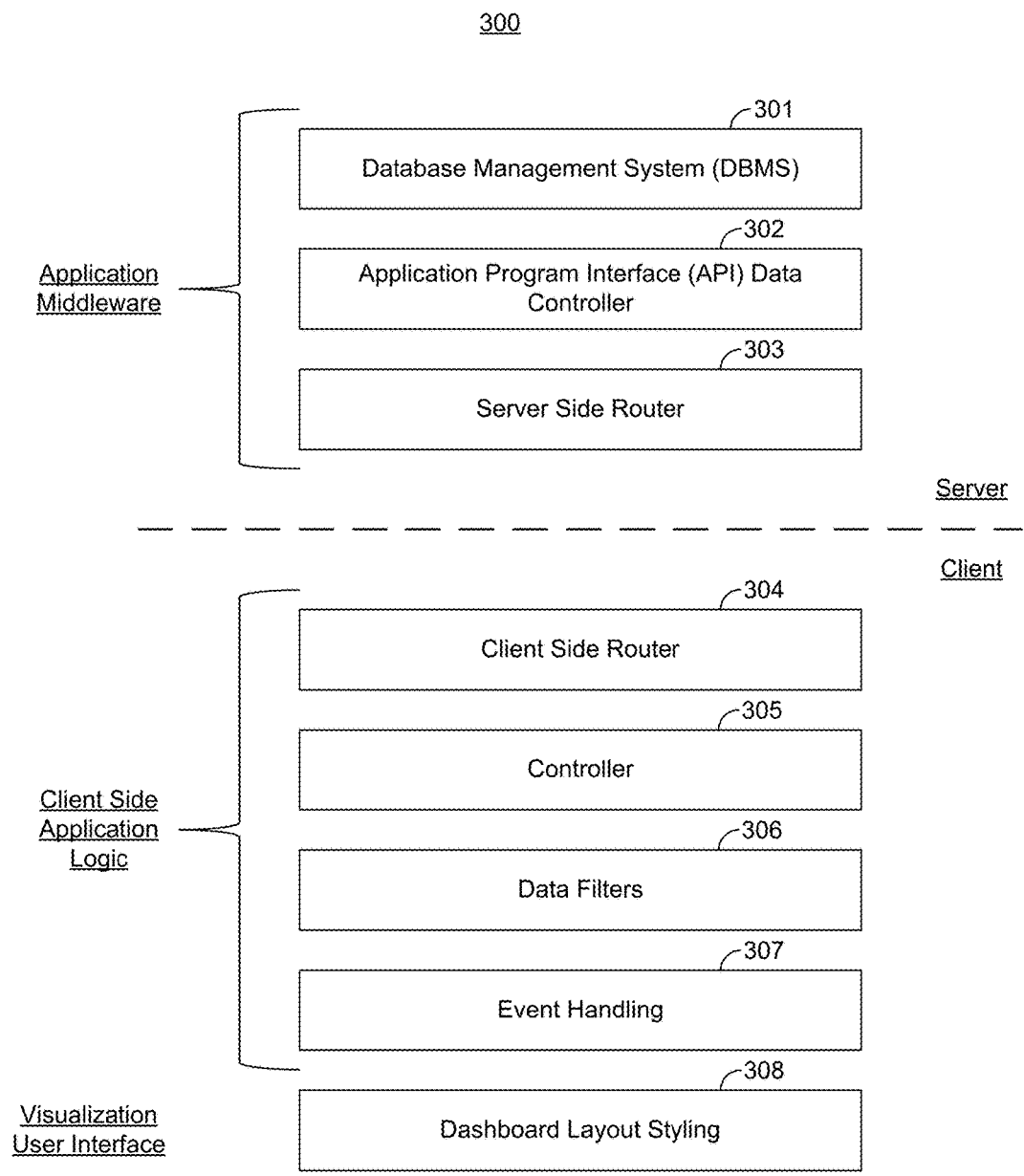
FIG. 3 illustrates an exemplary client-server block diagram describing components of a development platform running on a client-side communication device and a server-side communication device, according to some embodiments.

FIG. 3 illustrates an exemplary client-server block diagram describing components of the development platform 150 operating on a server side device (e.g., operating on application server 140), and components of the development platform 150 operating on a client side device (e.g., operating on communication device 110).

On the server side operations, application components of the development platform 150 may be running on, for example, at least portions of the application server 140, the database library 120, and/or the data server 160. The application components may include a database management system (DBMS) 301, an application program interface (API) data controller 302, and a server side routing component 303. DBMS 301 may be implemented by memory components of the application server 140, the database library 120, and/or the data server 160 during operation of development platform 150. API data controller 302 may be implemented by processor and/or controller components of application server 140. Server side routing component 303 may be implemented by network interface components and/or router components of application server 140.

On the client side operations, client side application logic components and visualization user interface components may be running on, for example, at least portions of communication device 110 and/or application server 140. The client side application logic components may include a client side router 304, a controller 305, data filters 306, and an event handling component 307. The visualization user interface component may include an exemplary dashboard layout styling 308. Dashboard layout styling 308 for the development platform 150 is illustrated by the exemplary development platform user interface 700 illustrated in FIG. 7 and the exemplary development platform user interface 800 illustrated in FIG. 8. Development platform user interface 700 and development platform user interface 800 commonly include a navigation section 710 and navigation section 810, respectively, comprised of various development tools for developing a web-based application. For example, navigation section 710 and navigation section 810 includes a visualization library menu 711 and a visualization library menu 811, a dashboard templates menu 712 and a dashboard templates menu 812, and a documentation menu 712 and a documentation menu 812, respectively.

Selection of the visualization library menu 711 or the visualization library menu 811 may present the user with selection tools for selecting a data visualization template according to any one or more of the described processes. For example, a data visualization template stored either on the application server 140, communication device 110, or database library 120 may be accessed and selected for developing a web-application according to the development platform 150. Selection of the visualization tool may further allow the user to select a data source for receiving data that will be reference when rendering a data visualization according to the selected data visualization template. Selection of the visualization tool may further allow the user to select a database (e.g., database library 120) for storing a new or modified data visualization template, and creating the metadata for attaching to the data visualization template.

Selection of the dashboard templates menu 712 or the dashboard templates menu 812 may present the user with selection tools for selecting a web-application template according to any one or more of the described processes. For example, a web-application template stored either on the application server 140, the communication device 110, or the database library 120 may be accessed and selected for developing a web-application.

Selection of the documentation tool 513 may allow the user to clarify usage of the tools, templates, and visualization components to the user. Documentation tools that may be provided in response to selection of the documentation tool 523 include manuals on how to install, debug, and use the framework, as well as instructions on how to contribute additional visualizations to the repository that are aligned to specified data specifications (i.e. in a structure that is amenable to a framework of the system).

Figure 4:
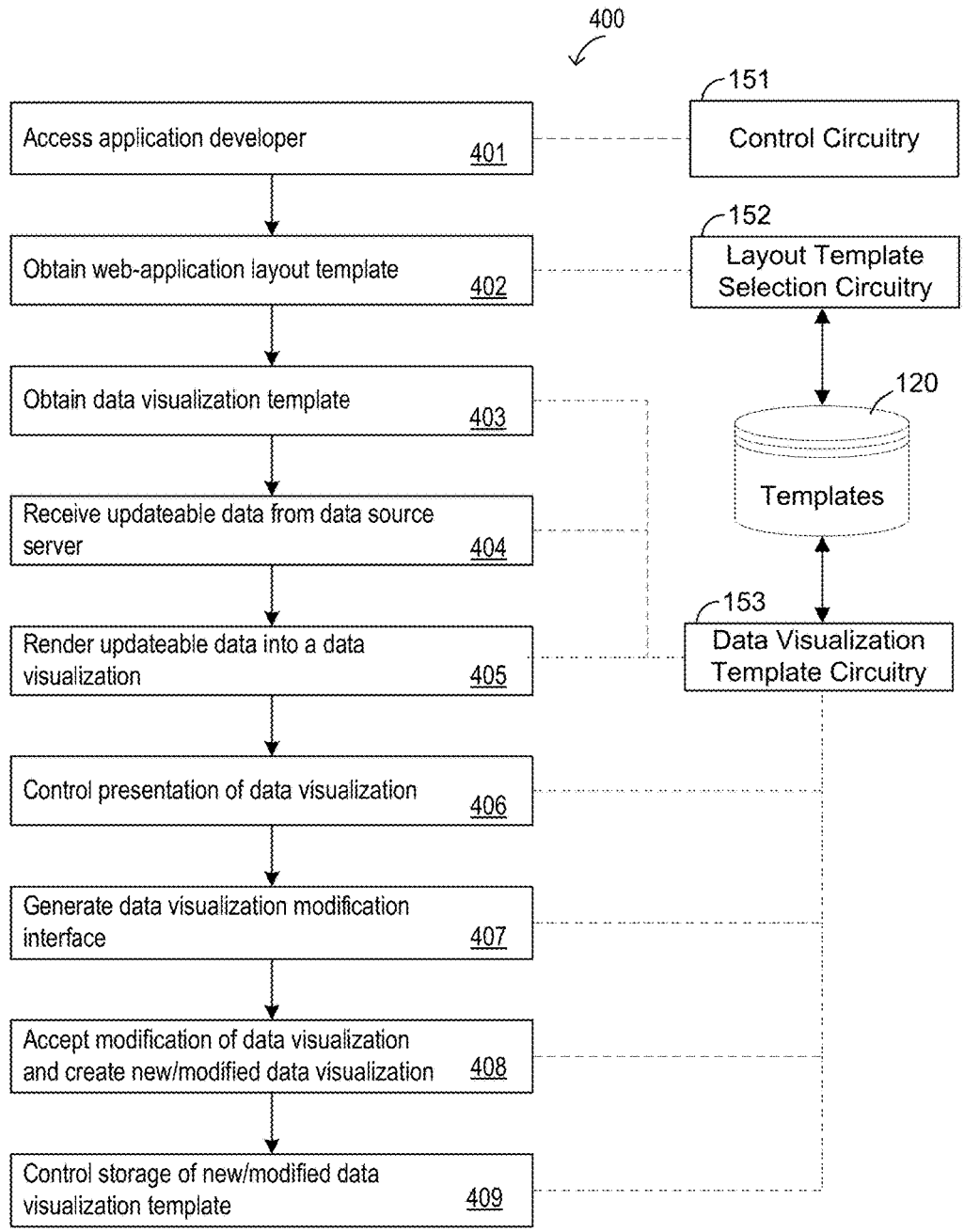
FIG. 4 illustrates a flow diagram of logic that a development platform system may implement.

FIG. 4 illustrates a flow diagram 400 of logic that the development platform system 100 may implement to provide and operate the development platform 150. The features described with relation to the flow diagram 400 may correspond to the development of a new web-based application by the development platform 150. References are made to components illustrated in FIG. 1 during the description of the flow diagram 400 for exemplary purposes.

A user operating communication device 110 may request access to development platform 150 by transmitting an access request signal from communication device 110 to application server 140 (401). Upon receipt of the access request signal, control circuitry 151 may implement a log-in protocol and/or security protocol based on the received access request according to any one or more of the described processes.

Figure 5:
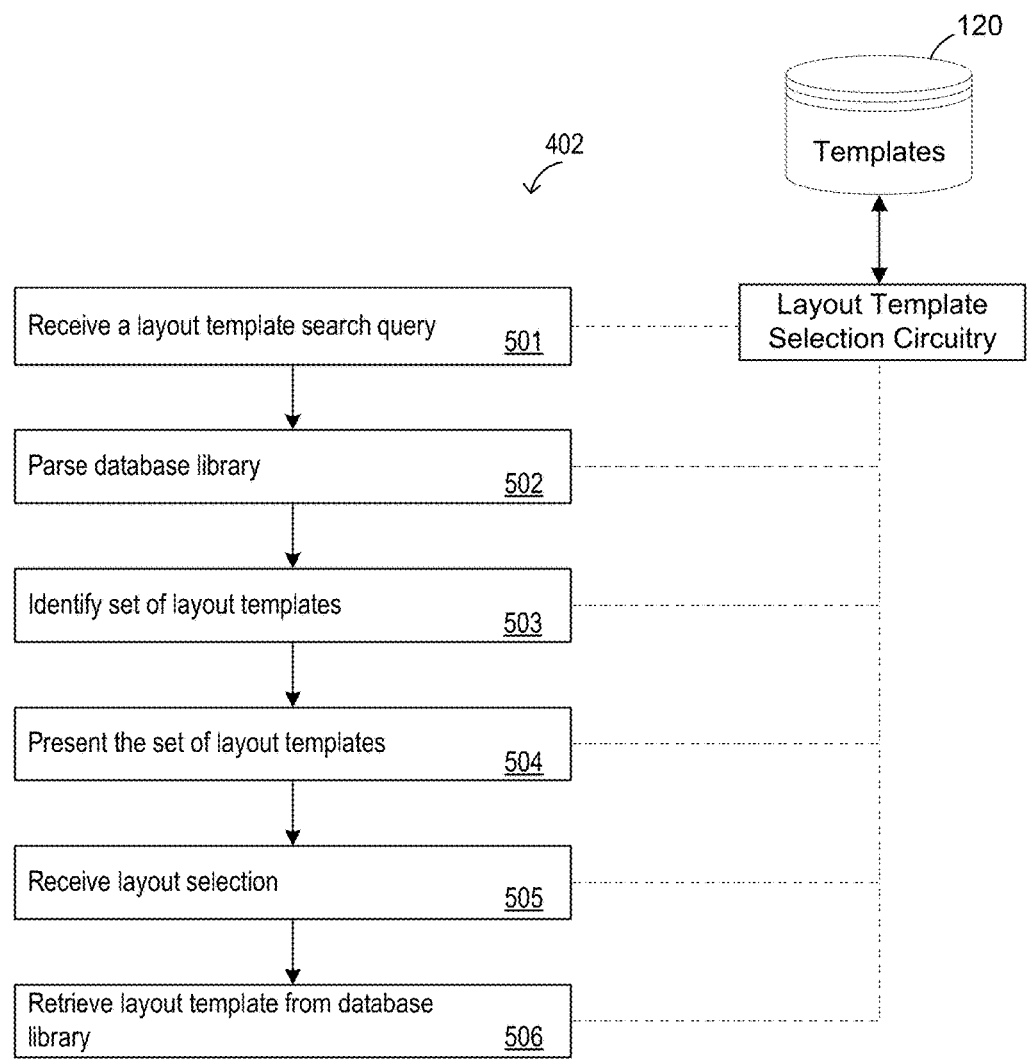
FIG. 5 illustrates an additional flow diagram of logic that a development platform system may implement.

Development platform 150 may obtain a web-application layout template based on user control inputs (402). For example, FIG. 5 illustrates a flow diagram of logic describing a number of processes that may comprise obtaining the web-application layout template (402). According to some embodiments, the layout template selection circuitry 152 may present the user with the development platform user interface 800 illustrated in FIG. 8.

The layout template selection circuitry 152 may receive the user's layout template search query input within, for example, search query input field 814 of development platform user interface 800 (501). The user's layout template search query may identify layout template attributes.

The layout template selection circuitry 152 may control parsing of database library 120 to identify one or more web-application layout templates that match, or otherwise corresponds, to the user's layout template search query (502).

The layout template selection circuitry 152 may identify one or more web-application layout templates that match, or otherwise corresponds, to the user's layout template search query (503).

The layout template selection circuitry 152 may present a search query result that includes one or more of the identified web-application layout templates (504). For example, development platform user interface 800 illustrates a search query result that includes blank canvas layout 801, angular 3-panel template 802, and backbone 3-panel template 803.

The layout template selection circuitry 152 may receive the user's selection input from the available web-application layout templates presented in the search query result (505).

The layout template selection circuitry 152 may obtain the selected web-application layout template from the database library 120 based on the user's selection input (506). The selected web-application layout template may include a data visualization panel.

Figure 6:
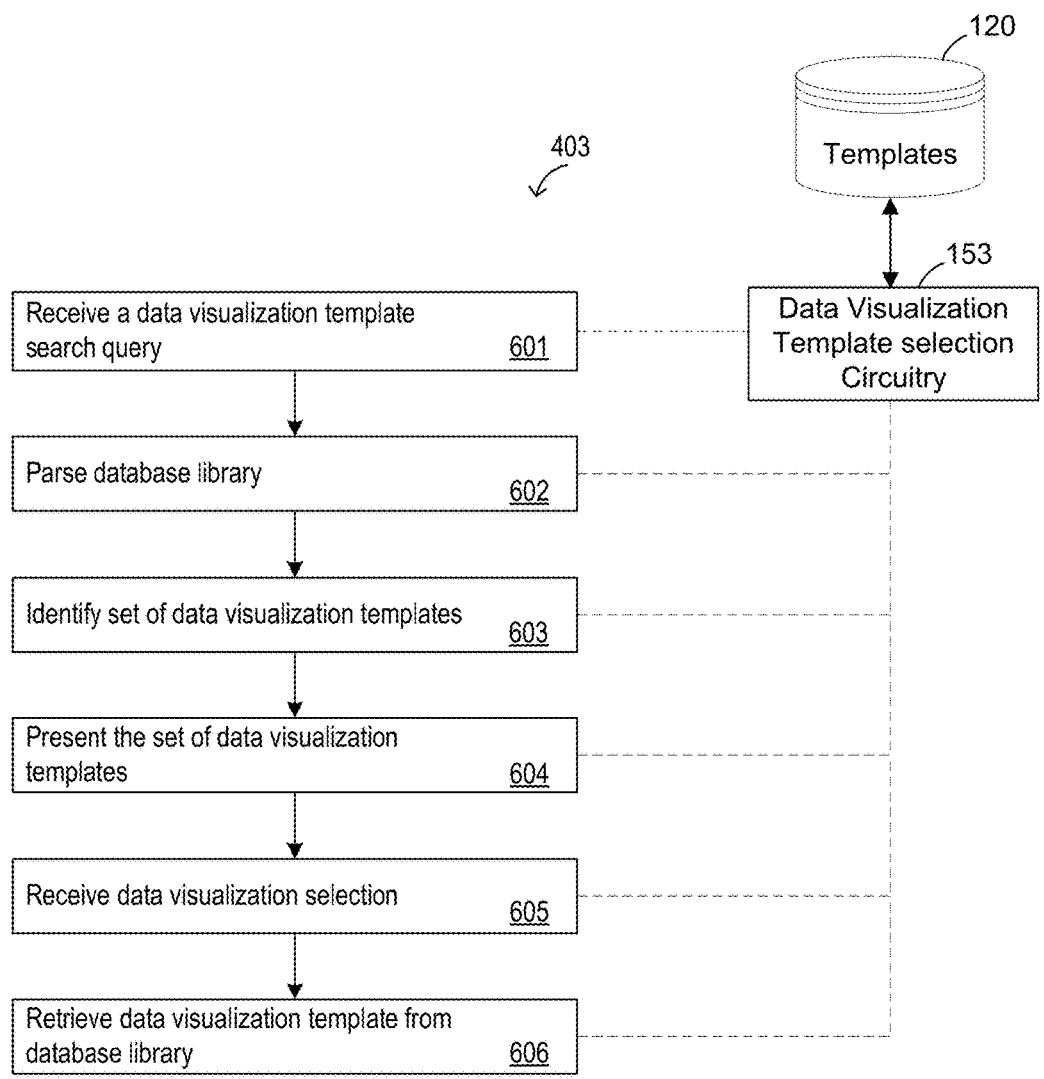
FIG. 6 illustrates an additional flow diagram of logic that a development platform system may implement.

Referring back to the flow diagram 400 of logic, the user may obtain a data visualization template that includes instructions for rendering a data visualization within a data visualization panel of the web-application layout template obtained (403). The user may obtain the data visualization template according to any one or more process for selecting a data visualization template described in this disclosure (403). For example, FIG. 6 illustrates a flow diagram describing a number of processes that may comprise obtaining the data visualization template (403). According to some embodiments, the data visualization template selection circuitry 153 may present the user with the development platform user interface 700 illustrated in FIG. 7.

The data visualization template selection circuitry 153 may receive the user's data visualization template search query input within, for example, search query input field 714 of development platform user interface 700 (601). The user's data visualization template search query may identify data visualization template attributes.

The data visualization template selection circuitry 153 may control parsing of database library 120 to identify one or more data visualization templates that match, or otherwise corresponds, to the user's layout template search query (602).

The data visualization template selection circuitry 153 may identify one or more data visualization templates that match, or otherwise corresponds, to the user's layout template search query (603).

The data visualization template selection circuitry 153 may present a search query result that includes one or more of the identified data visualization templates (604). For example, the development platform user interface 700 illustrates a search query result that includes a gauge chart 701, a geospatial map 702, and a scatterplot chart 703.

The data visualization template selection circuitry 153 may receive the user's selection input from the available data visualization templates presented in the search query result (605).

The data visualization template selection circuitry 153 may obtain the selected data visualization template from the database library 120 based on the user's selection input (606).

Referring back to the flow diagram 400 of logic, the development platform 150 may receive updateable data from a data source (e.g., data server 160) for supplying data that will be represented by the data visualization generated according to the obtained data visualization template (404). The obtained data visualization template may identify the data source based on identification information included in the data visualization template.

The development platform 150 may render the received updateable data into a data visualization formatted to the data visualization structure identified in the obtained data visualization template (405). In particular, the data visualization may be formatted into one of a plurality of available standardized data structures. For example, the data visualization may be formatted into one of the following standardized data structures: a real-time time series data structure, non-real-time time series data structure, or geospatial data structure. By rendering the updateable data into a standardized structure, the data visualization that is rendered may be reusable in other data visualization templates and other web-application layout templates referenced by development platform 150.

The development platform 150 may control presentation of the data visualization (406). For example, development platform 150 may control display of the data visualization within the data visualization panel of the web-based application being developed by the development platform 150.

Figure 9:
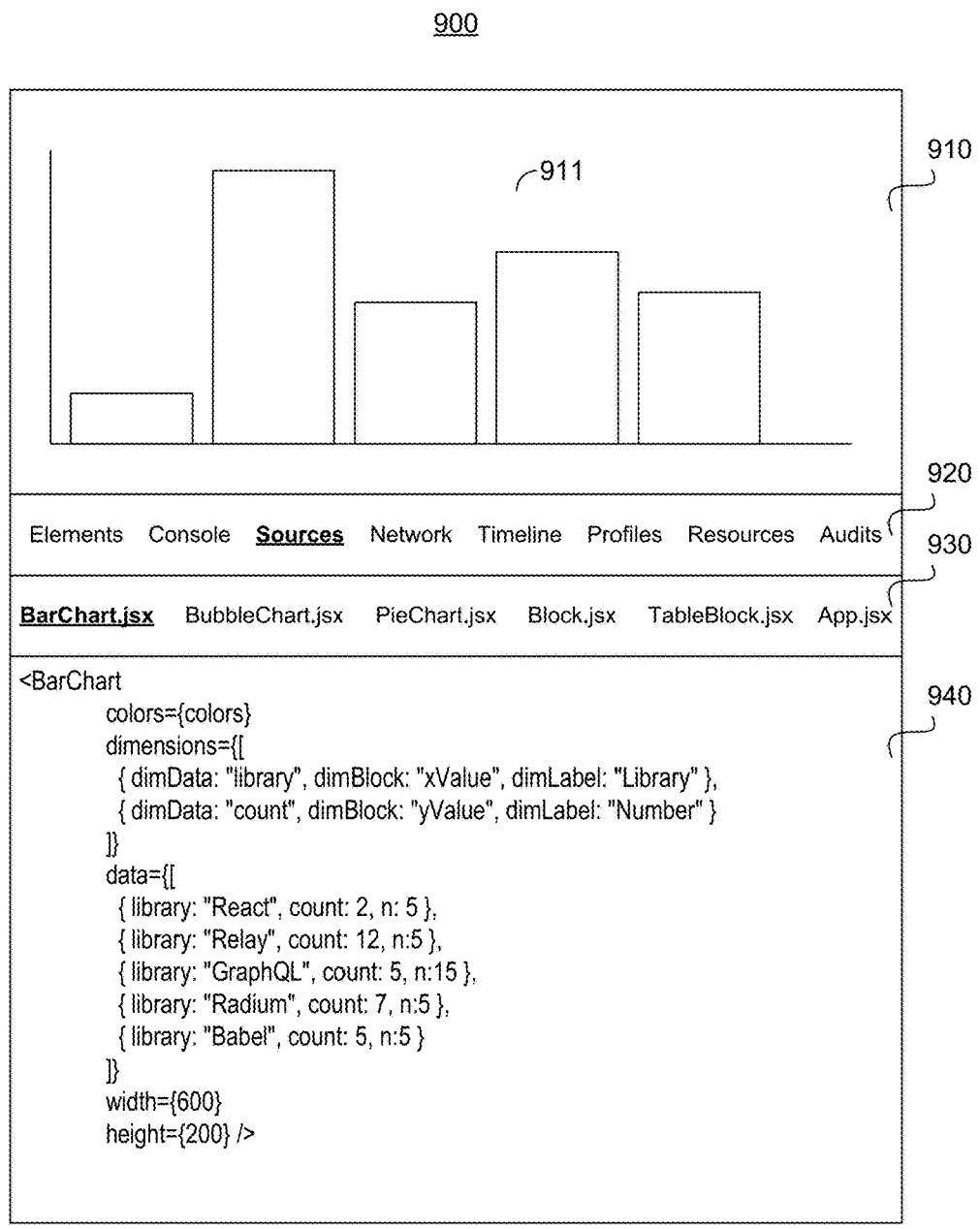
FIG. 9 illustrates an exemplary development tool of the development platform system for modifying a data visualization.

The development platform 150 may control the generation of a data visualization modification interface (407). The data visualization modification interface includes features enabling the user to modify attributes of the data visualization by directly modifying the program code related to the generation of the data visualization. For example, FIG. 9 illustrates an exemplary data visualization modification interface 900 that may be generated. Data visualization modification interface 900 may include a display section 910 configured to display a data visualization 911, a navigation panel 920 for displaying menu options, a sub-navigation panel 930 for displaying sub-menu options corresponding to a menu option selected from the navigation panel 920, and a coding section 940 for enabling the user to modify code for modifying attributes of data visualization 911. Data visualization 911 is rendered in a bar chart data structure. The data visualization modification interface 900 may allow modification of code within coding section 940 to modify a color of the data visualization 911, modify dimension of the data visualization 911, modify a data source for rendering the data visualization 911, modify a width of the data visualization 911, modify a height of the data visualization 911, change the data structure of the data visualization 911, or some combination thereof.

Figure 10:
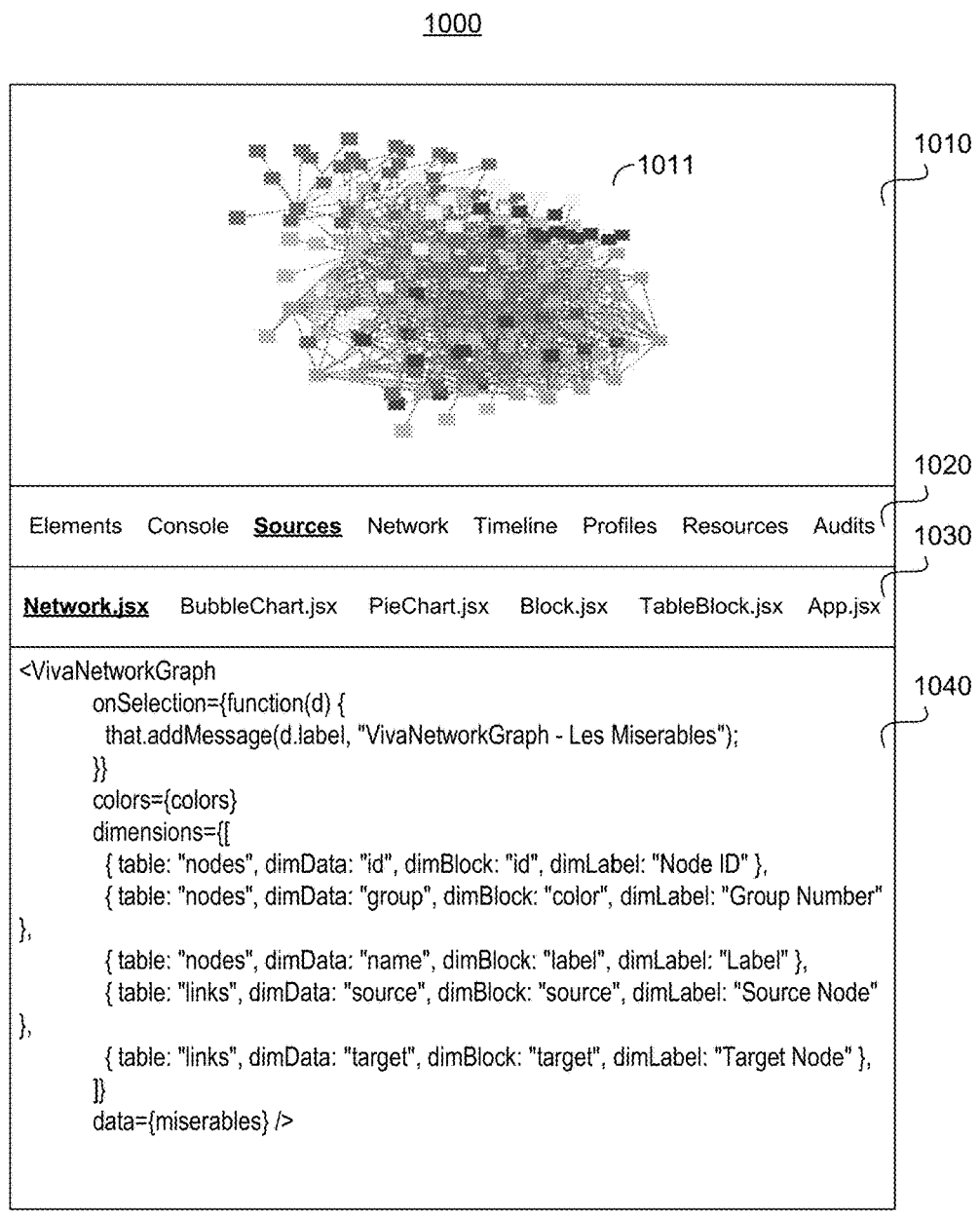
FIG. 10 illustrates an exemplary development tool of the development platform system for modifying a data visualization.

FIG. 10 illustrates another exemplary data visualization modification interface 1000 that may be generated. Data visualization modification interface 1000 may include a display section 1010 configured to display a data visualization 1011, a navigation panel 1020 for displaying menu options, a sub-navigation panel 1030 for displaying sub-menu options corresponding to a menu option selected from the navigation panel 1020, and a coding section 1040 for enabling the user to modify code for modifying attributes of data visualization 1011. Data visualization 1011 is rendered in a network graph data structure. The data visualization modification interface 1000 may allow modification of code within coding section 1040 to modify a color of the data visualization 1011, modify dimensions of the data visualization 1011, modify a data source for rendering the data visualization 1011, change the data structure of the data visualization 1011, or some combination thereof.

Figure 11:
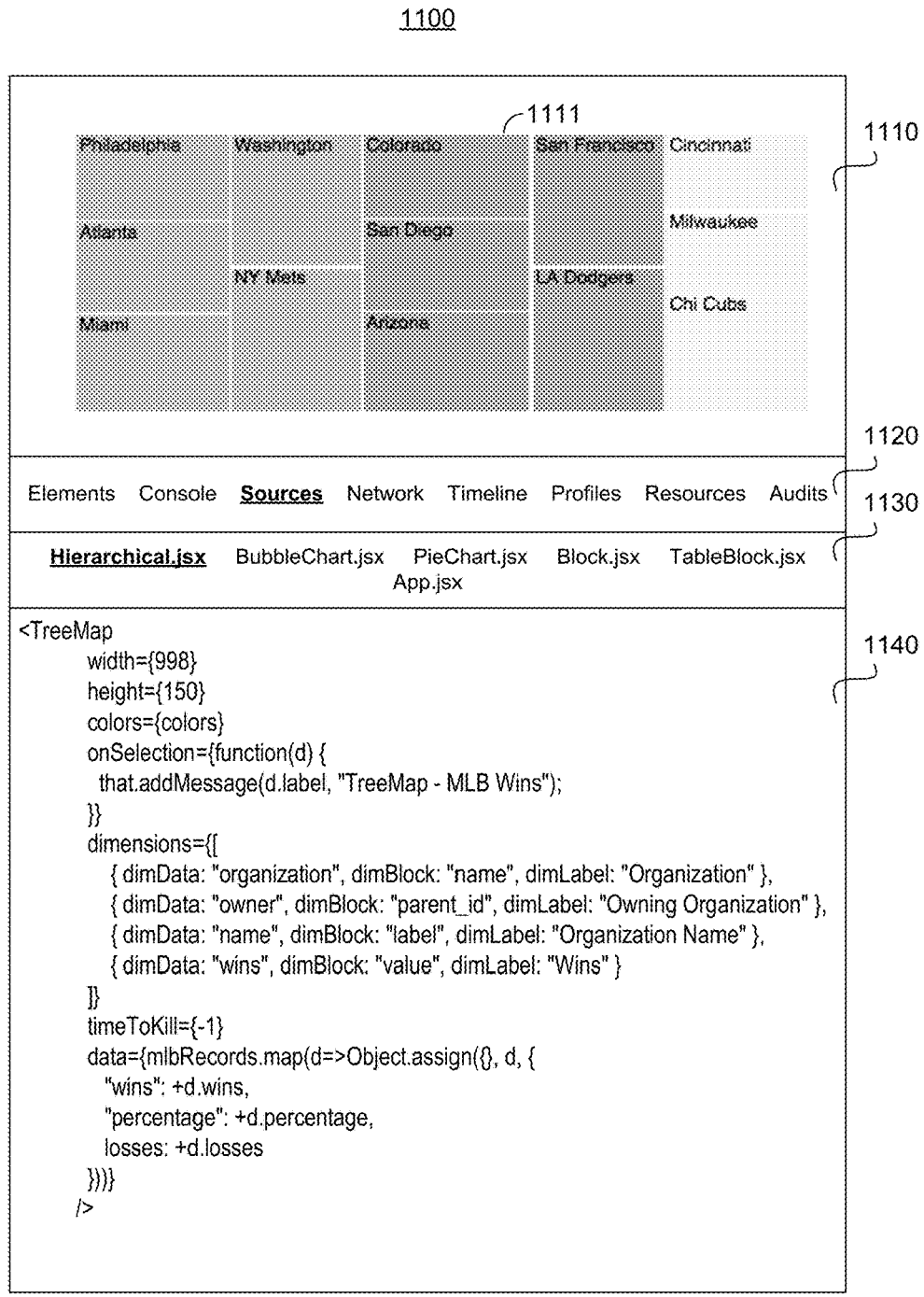
FIG. 11 illustrates an exemplary development tool of the development platform system for modifying a data visualization.

FIG. 11 illustrates another exemplary data visualization modification interface 1100 that may be generated. Data visualization modification interface 1100 may include a display section 1110 configured to display a data visualization 1111, a navigation panel 1120 for displaying menu options, a sub-navigation panel 1130 for displaying sub-menu options corresponding to a menu option selected from the navigation panel 1120, and a coding section 1140 for enabling the user to modify code for modifying attributes of data visualization 1111. Data visualization 1111 is rendered in a hierarchical graph data structure. The data visualization modification interface 1100 may allow modification of code within coding section 1140 to modify a width of the data visualization 1111, modify a height of the data visualization 1111, modify a color of the data visualization 1111, modify dimensions of the data visualization 1111, modify a data source for rendering the data visualization 1111, change the data structure of the data visualization 1111, or some combination thereof.

Figure 12:
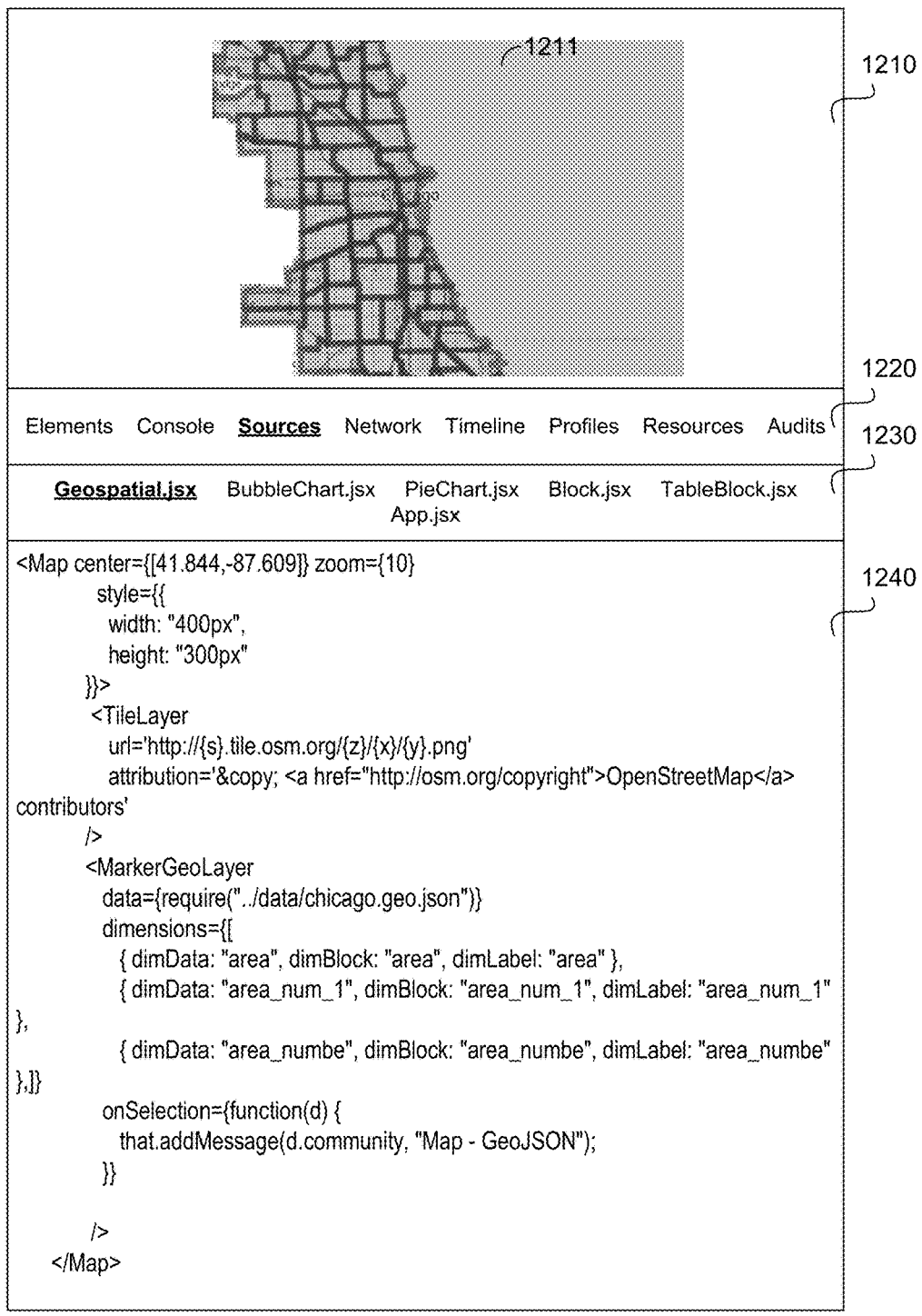
FIG. 12 illustrates an exemplary development tool of the development platform system for modifying a data visualization.

FIG. 12 illustrates another exemplary data visualization modification interface 1200 that may be generated. Data visualization modification interface 1200 may include a display section 1210 configured to display a data visualization 1211, a navigation panel 1220 for displaying menu options, a sub-navigation panel 1230 for displaying sub-menu options corresponding to a menu option selected from the navigation panel 1220, and a coding section 1240 for enabling the user to modify code for modifying attributes of data visualization 1211. Data visualization 1211 is rendered in a geospatial graph data structure. The data visualization modification interface 1200 may allow modification of code within coding section 1240 to modify a map center of the data visualization 1211, modify a width of the data visualization 1211, modify a height of the data visualization 1211, modify dimensions of the data visualization 1211, modify a data source for rendering the data visualization 1211, modify a map source for rendering the data visualization 1211, change the data structure of the data visualization 1211, or some combination thereof.

Figure 13:
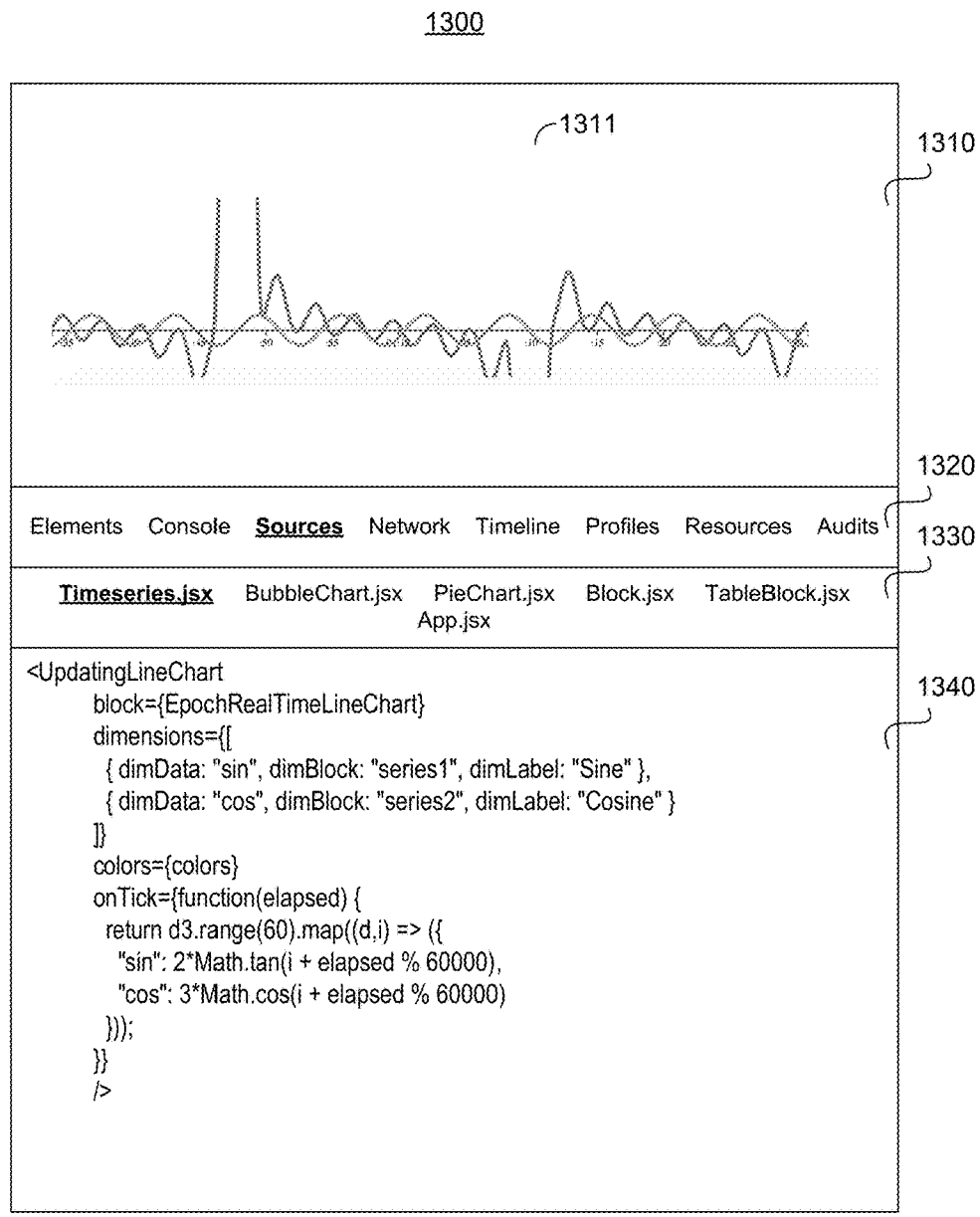
FIG. 13 illustrates an exemplary development tool of the development platform system for modifying a data visualization.

FIG. 13 illustrates another exemplary data visualization modification interface 1300 that may be generated. Data visualization modification interface 1300 may include a display section 1310 configured to display a data visualization 1311, a navigation panel 1320 for displaying menu options, a sub-navigation panel 1330 for displaying sub-menu options corresponding to a menu option selected from the navigation panel 1320, and a coding section 1340 for enabling the user to modify code for modifying attributes of data visualization 1311. Data visualization 1311 is rendered in a time series graph data structure. The data visualization modification interface 1300 may allow modification of code within coding section 1340 to modify dimensions of the data visualization 1311, modify a color modify of the data visualization 1311, modify a data source for rendering the data visualization 1311, change the data structure of the data visualization 1311, modifying a geometric function (e.g., sin, cos, tan) for rendering the data visualization 1311, or some combination thereof.

According to some embodiments, the user may have access to modify attributes of the data visualization based on the user's determined access level as authenticated by control circuitry 151. For example, the user may be authorized to modify certain attributes of the data visualization, while being prevented from accessing modification to other attributes of the data visualization, based on the user's access level. Exemplary data visualization attributes that may be modified directly by modification of the controlling software code include, but are not limited to, data visualization structure, dimensions (e.g., height, width, depth), color, data source, name, data update interval, industry relating to the data visualization, and/or other visual or controlling attributes.

Referring back to the flow diagram 400 of logic, software code modifications made within the data visualization modification interface may be accepted (408). The acceptance of modifications to certain attributes of the data visualization may be made according to the user's determined access level, as described. Also, the development platform may create new and/or updated metadata that describe attributes of the modified data visualization (408).

The development platform 150 may control storage of the new and/or modified data visualization template that includes the modified data visualization (409). The new and/or modified data visualization template may be stored in database library 120. The corresponding metadata may also be stored in database library 120, where the modified data visualization template may be subsequently retrieved from the database library 120 based on a search query matching, or otherwise relating to, the metadata describing attributes of the modified data visualization template.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:
1. A system, comprising:
   a network interface configured to:
      communicate with a database library; and
      communicate with a computing device;
   a processor configured to communicate with the network interface, the processor further configured to:
      receive, through the network interface, a template query from the computing device, wherein the template query includes requests for components to an application development;
      access, through the network interface, the database library and identify a layout template stored on the database library based on the template query, the layout template including a data visualization panel and a navigation panel;
      control presentation of the layout template on a graphical user interface (GUI) of the computing device;
      receive, through the network interface, a selection input from the computing device selecting the layout template;
      control the GUI to display the layout template on the computing device;

obtain, through the network interface, a data visualization template corresponding to the data visualization panel from the database library;
receive, through the network interface, updateable data from a data source server;
render, within the data visualization panel of the layout template, the updateable data into a data visualization according to a predetermined data visualization structure;
control display of the data visualization in the data visualization panel within the layout template;
present a data visualization modification interface within the data visualization panel;
receive, through the network interface, a modification command corresponding to a modification option included in the data visualization modification interface; and modify the data visualization.

2. The system of claim 1, wherein the predetermined data visualization structure is a standard data visualization structure.

3. The system of claim 1, wherein the updateable data is updated in real-time by the data source server; and
wherein the processor is configured to render the updateable data into the data visualization by:
receiving updates to the updateable data from the data source server; and
rendering the data visualization according to the updates to the updateable data.

4. The system of claim 1, wherein the modification command includes a data source option, a visualization type option, a visualization look option, or a combination thereof.

5. The system of claim 1, wherein the data visualization panel includes a display section, a navigation panel, a coding section, or a combination thereof.

6. The system of claim 5, wherein the coding section is modifiable by user inputs at the computing device.

7. A method, comprising:
receiving, through a network interface, a template query from a computing device, wherein the template query includes requests for components to an application development;
accessing, through the network interface, a database library;
identifying a layout template stored on the database library based on the template query, the layout template including a data visualization panel and a navigation panel;
controlling presentation of the layout template on a graphical user interface (GUI) of the computing device;
receiving, through the network interface, a selection input from the computing device selecting the layout template;
controlling the GUI to display the layout template on the computing device;
obtaining, through the network interface, a data visualization template corresponding to the data visualization panel from the database library;
receiving, through the network interface, updateable data from a data source server;
rendering, within the data visualization panel of the layout template, the updateable data into a data visualization according to a predetermined data visualization structure;
controlling display of the data visualization in the data visualization panel within the layout template;
presenting a data visualization modification interface within the data visualization panel;
receiving, through the network interface, a modification command corresponding to a modification option included in the data visualization modification interface; and modifying the data visualization.

8. The method of claim 7, wherein the predetermined data visualization structure is a standard data visualization structure.

9. The method of claim 7, wherein the updateable data is updated in real-time by the data source server; and
wherein rendering the updateable data into the data visualization comprises:
receiving updates to the updateable data from the data source server; and
rendering the data visualization according to the updates to the updateable data.

10. The method of claim 7, wherein the modification command includes a data source option, a visualization type option, a visualization look option, or a combination thereof.

11. The method of claim 7, wherein the data visualization panel includes a display section, a navigation panel, a coding section, or a combination thereof.

12. The method of claim 11, wherein the coding section is modifiable by user inputs at the computing device.

13. An application server system, comprising:
a network interface configured to:
communicate with a database library;
communicate with a computing device; and
communicate with a data source server;
a processor configured to communicate with the network interface, the processor further configured to:
receive, through the network interface, a template query from the computing device, wherein the template query includes requests for components to an application development;
access, through the network interface, the database library and identify a layout template stored on the database library based on the template query, the layout template including a data visualization panel and a navigation panel;
control presentation of the layout template on a graphical user interface (GUI) of the computing device;
receive, through the network interface, a selection input from the computing device selecting the layout template;
control the GUI to display the layout template on the computing device;
obtain, through the network interface, a data visualization template corresponding to the data visualization panel from the database library;
receive, through the network interface, updateable data from a data source server;
render, within the data visualization panel of the layout template, the updateable data into a data visualization according to a predetermined data visualization structure;
control display of the data visualization in the data visualization panel within the layout template;
present a data visualization modification interface within the data visualization panel; receive, through the network interface, a modification command corresponding to a modification option included in the data visualization modification interface; and modify the data visualization.

14. The application server system of claim 13, wherein the updateable data is updated in real-time by the data source server; and wherein the processor is configured to render the updateable data into the data visualization by:
receiving updates to the updateable data from the data source server; and
rendering the data visualization according to the updates to the updateable data.

15. The application server system of claim 13, wherein the modification command includes a data source option, a visualization type option, a visualization look option, or a combination thereof.

16. The application server system of claim 13, wherein the data visualization panel includes a display section, a navigation panel, a coding section, or a combination thereof.

17. The system of claim 16, wherein the coding section is modifiable by user inputs at the computing device.

* * * * *